United States Patent

Allison

[15] 3,640,218
[45] Feb. 8, 1972

[54] SEAL ASSEMBLY FOR SLEEVE-TYPE GRAVURE ROLLS

[72] Inventor: Thomas K. Allison, 590 Camden Ave., Moorestown, N.J. 08057

[22] Filed: June 25, 1970

[21] Appl. No.: 49,771

Related U.S. Application Data

[63] Continuation-in-part of Ser. No. 814,658, Apr. 9, 1969, abandoned.

[52] U.S. Cl. ..................................101/375, 29/113, 29/123
[51] Int. Cl. ................B41f 13/20, B21b 27/00, B21b 31/32
[58] Field of Search .................277/34.3; 101/375, 376, 328, 101/378, 329, 330, 331, 349, 350; 29/110, 113, 117, 123, 125

[56] References Cited

UNITED STATES PATENTS

| | | | |
|---|---|---|---|
| 1,030,364 | 6/1912 | Whitman | 29/117 |
| 1,958,299 | 5/1934 | Erickson | 29/117 |
| 2,114,378 | 4/1938 | Gundlach | 29/125 X |
| 2,987,994 | 6/1961 | Allison | 29/113 X |
| 2,719,737 | 10/1955 | Fletcher | 277/34.3 |
| 3,146,160 | 8/1964 | Kankaanpaa | 29/113 |
| 3,362,733 | 1/1968 | Klara | 29/113 |
| 3,400,648 | 9/1968 | Izmailov et al. | 29/117 |

FOREIGN PATENTS OR APPLICATIONS

| 964,148 | 5/1957 | Germany | 101/375 |
|---|---|---|---|

*Primary Examiner*—William B. Penn
*Attorney*—Howson and Howson

[57] ABSTRACT

A seal assembly for sealing a sleeve-type gravure roll to prevent ink penetration between the roll end members and the sleeve. Each seal assembly includes an inwardly beveled conical surface on the end member, a resilient seal ring disposed adjacent the conical surface, a pressure ring disposed adjacent the sealing ring, and a winding of pneumatic tubing located inwardly of and adjacent the pressure ring. Inflation of the tubing forces the pressure ring against the sealing ring and expands the sealing ring outwardly along the conical surface of the end member into engagement with the inner surface of the sleeve end, the sealing ring being elastically deformed so as to completely fill the space between the sleeve end and the end member to prevent penetration of ink beneath the sleeve.

5 Claims, 5 Drawing Figures

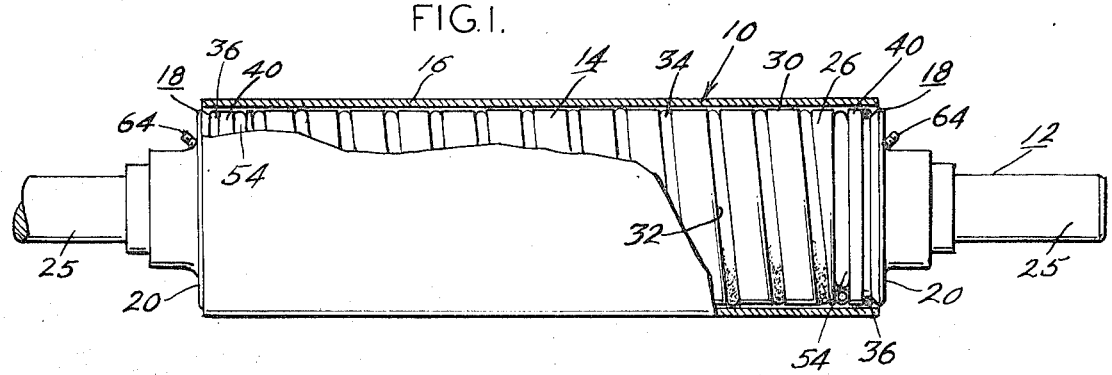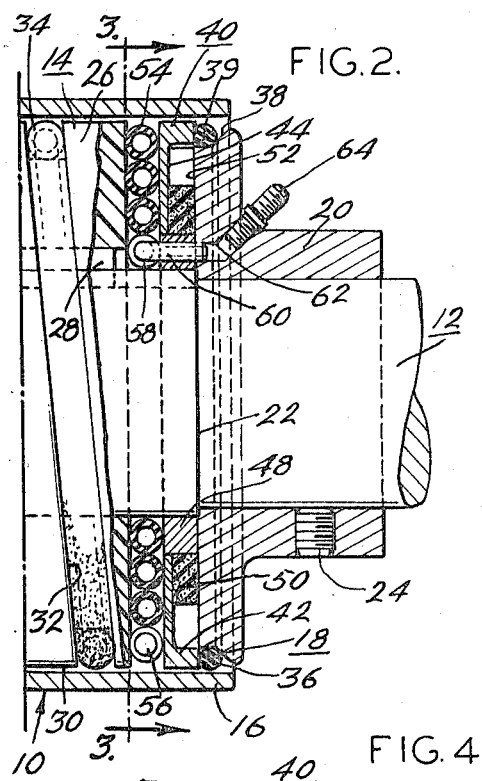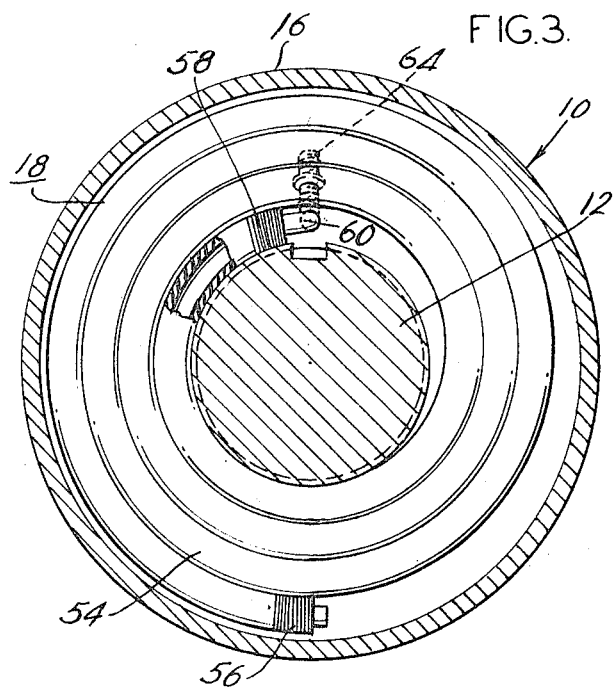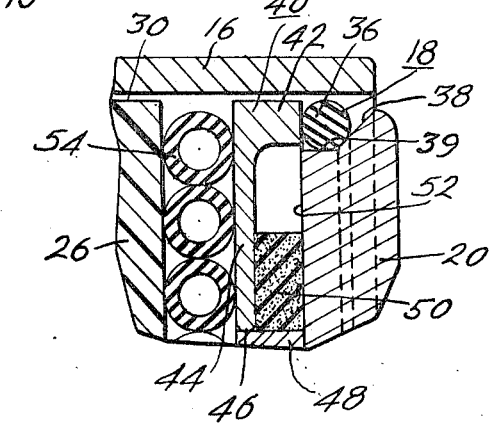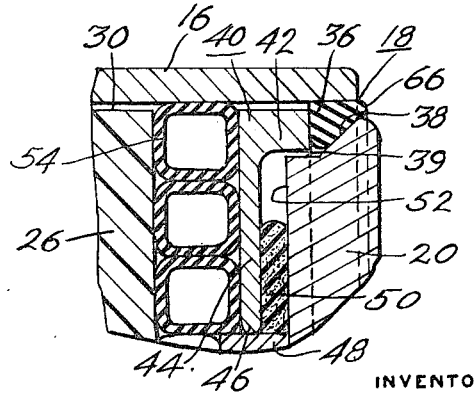

SEAL ASSEMBLY FOR SLEEVE-TYPE GRAVURE ROLLS

This application is a continuation-in-part of my copending application Ser. No. 814,658, filed Apr. 9, 1969, entitled "Gravure Roll Assembly" (now abandoned).

The present invention relates generally to gravure printing rolls and relates more particularly to a seal assembly for sealing the ends of sleeve-type gravure roll assemblies.

Gravure printing rolls have conventionally comprised a heavy steel cylinder having a wall thickness ranging up to 1 inch. The outer surface of the conventional cylinder is copper plated and ground to form a smooth cylindrical surface which is subsequently etched with the subject matter to be printed. The expense and difficulty inherent in producing and handling the conventional heavy cylinder led to the development of a roll assembly comprising a thin-walled light weight tubular sleeve which is mounted on an expandable mandrel. An example of a sleeve and mandrel-type printing roll assembly is shown in my U.S. Pat. No. 2,987,994, issued on June 13, 1961. In this patented construction, the thin-walled tubular sleeve is gripped and supported by a pneumatic tube helically wound on a cylindrical mandrel core.

Because of the immersion of the roll assembly in an ink bath during use, some type of sealing means is required with a sleeve-type roll to prevent the penetration of ink into the roll assembly at the sleeve ends. Any ink buildup on the underside of the sleeve will interfere with the sliding removal of the sleeve from the assembly. In the above patent, a pneumatic circumferential tube seal is employed at each end of the sleeve. This arrangement, however, does not provide a completely effective seal since the pneumatic tube cannot be located at the extreme ends of the assembly, and ink can penetrate for at least a short distance beneath the sleeve ends.

In the present invention, the end members of the roll assembly each include an inwardly beveled conical circumferential surface underlying the sleeve ends. A resilient seal ring is disposed adjacent the conical surface, the ring in its relaxed condition having a diameter slightly less than the inner diameter of the sleeve. A pressure ring disposed inwardly of each sealing ring is moved axially against the sealing ring upon inflation of a circumferential winding of pneumatic tubing located inwardly adjacent the pressure ring. The axial movement of the pressure ring moves the sealing ring along the beveled surface of the end member into engagement with the inner surface of the sleeve in such a manner as to deform the sealing ring and extrude a portion of the ring axially outwardly of the sleeve end, thus insuring that ink cannot penetrate beneath any portion of the sleeve. Means such as a resilient washer are preferably located between the end member and pressure ring to move the pressure ring axially inwardly upon deflation of the tubing, thus permitting the seal ring to return to its relaxed diameter and allowing the sleeve to be slidably removed from the assembly.

It is accordingly a first object of the present invention to provide a seal assembly for sleeve-type gravure rolls which will prevent any penetration of ink beneath the sleeve ends.

A further object of the invention is to provide a seal assembly as described which may be pneumatically actuated.

A still further object is to provide a seal assembly as described which when actuated provides a visually evident sealing effect.

Another object of the invention is to provide a seal assembly as described of a simple, effective construction which can be inexpensively fabricated.

Additional objects and advantages of the invention will be more readily apparent from the following detailed description of an embodiment thereof when taken together with the accompanying drawings in which:

FIG. 1 is a side view of a sleeve-type gravure roll assembly having seal assemblies at each end thereof in accordance with the present invention, the roll sleeve being broken away to show the location of the seal assemblies;

FIG. 2 is an enlarged sectional view of the right-hand seal assembly of FIG. 1;

FIG. 3 is a sectional view taken along line 3—3 of FIG. 2;

FIG. 4 is an enlarged partial sectional view of the seal assembly in the relaxed condition; and FIG. 5 is a view similar to FIG. 4 showing the seal assembly in the actuated sealing condition.

Referring to the drawings, a sleeve-type gravure roll assembly generally designated 10 is shown in FIG. 1 and includes a shaft 12 carrying an expandable mandrel 14 over which a thin-walled tubular sleeve 16 is disposed. Seal assemblies 18 in accordance with the present invention are provided at each end of the expanding mandrel to prevent ink penetration beneath the sleeve ends.

Although the present seal assemblies could be used with any sleeve-type gravure roll assembly, the illustrated roll is similar to that shown in my U.S. Pat. No. 2,987,994. The assembly in brief includes end members 20 secured to stepped portions of the shaft in axially spaced relation. As shown in FIG. 2, the end members abut a shoulder 22 of the shaft and are secured to the shaft by a setscrew 24. The extending end portions 25 of the shaft are adapted to be journaled in suitable bearings in a printing press. Between the end members 20, a hollow mandrel core 26 is secured to the shaft by a key 28 and has an outer cylindrical surface 30 which is slightly smaller than the inner diameter of the sleeve 16. A helical slot 32 in the surface 30 of the mandrel core carries a helical winding 34 of pneumatic tubing which is sealed at one end and connected with suitable valve means (not shown) at the other end which extends through one of the end members. Upon inflation, the tubing 34 expands in the slot 32 and engages the inner surface of the sleeve 16 to support and grip the sleeve for rotation with the shaft 12.

As shown in detail in FIGS. 2–5, each of the seal assemblies 18 includes a resilient seal ring 36 which has a relaxed diameter slightly less than the inner diameter of the sleeve and which is disposed adjacent an axially inwardly beveled conical surface 38 of the end member 20. The surface 38, which is radially opposed from the end of the sleeve, intersects at its inner end a cylindrical surface 39 of the end member which serves as a seat for the seal ring in its relaxed state.

A pressure ring 40 located axially inwardly adjacent the seal ring 36 includes an axially extending seal ring engaging portion 42 and a radially extending portion 44. The bore 46 of the pressure ring 40 is sized to permit sliding movement of the ring along the annular spacer 48 fixed to the shaft adjacent the end member 20. A resilient washer 50 which might for example be made of sponge rubber, is disposed between the portion 44 of the pressure ring and the inner face 52 of the end member 20.

A winding 54 of pneumatic tubing is disposed axially inwardly adjacent the pressure ring 40, between the pressure ring and the end of the mandrel core 26. As shown in FIGS. 2 and 3, the tubing is wound in the illustrated embodiment 3½ times around the shaft and the outer end 56 is plugged and sealed. The inner end 58 of the tubing is connected to a tubular fitting 60 which passes through the spacer 48 and into a passage 62 in the end member 20. A conventional valve 64 is threadedly secured in the outer end of the passage 62.

For operation of the present seal assembly, the sleeve 16 is slidably positioned on the roll assembly in the manner illustrated with the sleeve ends disposed opposite the conical surfaces 38 of the end members 20. The mandrel 14 is then expanded, in the present instance by inflating the tube 34, to support and secure the sleeve in place on the roll assembly. Air pressure is then applied to each valve 64 by suitable means (not shown) to inflate the winding 54, the expansion thereof urging the pressure ring 40 away from the mandrel core 26. The axial movement of the pressure ring toward the end member moves the resilient seal ring 36 along the conical surface 38 into engagement with the inner surface of the sleeve 16. The pressure applied to the tubing 54 should be sufficient to deform the ring 36 in the manner shown in FIG. 5 wherein a portion 66 of the ring is extruded beyond the end of the sleeve. In this manner, the seal ring prevents any entrance of ink beneath the sleeve during rotation of the roll assembly in the ink bath, and in addition provides a visible indication that the seal is properly established. Although the portion 66 of the seal ring will become coated with ink, this may be easily removed with solvent prior to release of the seal.

For release of the seal assembly, the valve 64 is opened to permit the deflation of the tubing winding 54 which allows the pressure ring to move axially inwardly under the resilient influence of both the seal ring 36 and the resilient washer 50. Following release, the assembly again assumes the condition shown in FIG. 4 wherein the seal ring 36 has returned to the surface 39, thus freeing the sleeve 16 for removal from the assembly when the expanding mandrel has been released.

Although the seal ring 36 is shown in the preferred form as an O-ring, it will be apparent that numerous other cross-sectional shapes could be effectively employed in view of the resilient nature of the ring. The seal ring may be made of any suitable elastomer such as rubber, neoprene, Buna-S, polyurethane, etc.

The surface 38, illustrated in the preferred embodiment as a frustoconical surface, could obviously be modified to have a slightly concave or convex cross-sectional configuration within the scope of the invention. The term "substantially conical" is thus intended to include such obvious modifications.

Manifestly, changes in details of construction can be effected by those skilled in the art without departing from the spirit and the scope of the invention as defined in and limited solely by the appended claims.

I claim:

1. In a gravure roll assembly including a thin-walled tubular gravure printing sleeve, and an expanding mandrel for supporting and driving the sleeve in rotation, said mandrel including a shaft, a pair of axially spaced end members secured to the shaft, and means on the shaft between the end members selectively radially expandable against the sleeve, the improvement comprising seal means for sealing each end of the sleeve adjacent the end members, said seal means comprising an axially inwardly beveled substantially conical surface on each of the end members, a resilient seal ring disposed adjacent said annular surface, said seal ring having a relaxed diameter slightly less than the inner diameter of the sleeve, a pressure ring disposed inwardly adjacent said seal ring, and means for selectively providing axial movement of said pressure ring toward the end member to move said seal ring along said conical surface into a sealing disposition between the end member and the inner surface of the sleeve.

2. The invention as claimed in claim 1 including means for resiliently biasing said pressure ring axially away from the end member.

3. The invention as claimed in claim 2 wherein said latter means includes a ring of resilient material disposed between the end member and said pressure ring.

4. The invention as claimed in claim 1 wherein said means for selectively providing axial movement of said pressure ring comprises fluid pressure actuated means.

5. The invention as claimed in claim 4 wherein said fluid actuated means comprises a length of pneumatic tubing wound circumferentially about the shaft, and valve means communicating with said tubing extending exteriorly of the end member.

* * * * *